United States Patent [19]

Smith

[11] Patent Number: 5,275,430
[45] Date of Patent: Jan. 4, 1994

[54] TRAILER SUSPENSION APPARATUS

[75] Inventor: Earl D. Smith, Scottsdale, Ariz.

[73] Assignee: DBX Engineering Corporation, Indianapolis, Ind.

[21] Appl. No.: 831,678

[22] Filed: Feb. 5, 1992

[51] Int. Cl.$^5$ ................................. B60G 11/26
[52] U.S. Cl. ........................ 280/711; 280/688; 280/713
[58] Field of Search ............. 280/711, 688, 713, 789, 280/690, 698, 705, 714, 682, 702, 840

[56] References Cited

U.S. PATENT DOCUMENTS

| | | | |
|---|---|---|---|
| 2,507,980 | 5/1950 | Knapp | 280/124 |
| 3,078,104 | 2/1963 | Chalmers | 280/124 |
| 3,140,880 | 7/1964 | Masser | 280/124 |
| 3,356,386 | 12/1967 | Taylor | 280/106.5 |
| 3,704,898 | 12/1972 | Schmidt | 280/124 R |
| 3,880,445 | 4/1975 | Chieger | 280/106 R |
| 3,884,502 | 5/1975 | Wagner | 280/423 R |
| 4,032,167 | 6/1977 | Chereda | 280/106 T |
| 4,095,818 | 6/1978 | Smith | 280/789 |
| 4,166,640 | 9/1979 | Van Denberg | 280/711 |
| 4,202,564 | 5/1980 | Strader | 280/678 |
| 4,252,340 | 2/1981 | Egging | 280/682 |
| 4,427,213 | 1/1984 | Raidel, Jr. | 280/711 |
| 4,465,298 | 8/1984 | Raidel, Sr. | 280/711 |
| 4,541,653 | 9/1985 | Raidel | 280/711 |
| 4,580,798 | 4/1986 | Roelofs | 280/6 R |
| 4,593,930 | 6/1986 | Davis | 280/690 |
| 4,615,539 | 10/1986 | Pierce | 280/690 |
| 4,619,578 | 10/1986 | Routledge | 414/498 |
| 4,666,181 | 5/1987 | Wegner | 280/711 |
| 4,677,263 | 6/1987 | Hamilton et al. | 280/61.44 |
| 4,718,692 | 1/1988 | Raidel | 280/713 |
| 4,878,691 | 11/1989 | Cooper et al. | 280/189 |
| 4,934,733 | 6/1990 | Smith et al. | 280/711 |
| 5,016,912 | 5/1991 | Smith et al. | 280/711 |

FOREIGN PATENT DOCUMENTS

692854 6/1953 United Kingdom .

Primary Examiner—Joseph D. Pape

[57] ABSTRACT

A wheel suspension system is disclosed which includes a wheel support member pivotally mounted to a vehicle frame, a wheel rotatably mounted to the support member on a stub axle, and an airbag positioned between the wheel support member and the vehicle frame to bias the support member into an intermediate position between a lowermost position and an uppermost position, the rotational axis of the wheel being positioned at or above the cargo floor of the vehicle at least when the wheel support member is in the uppermost position. The suspension system provides a compact lateral profile and also aligns the pivot axis and biasing airbag on a common side of the wheel to provide a compact profile along the length of the vehicle. The compact lateral profile of the suspension system is enhanced by a lateral stabilizer configuration that includes a leaf spring extending parallel to the longitudinal axis of the vehicle directly adjacent the suspension system, thus providing maximum distance between the wheels and permitting the cargo floor to be supported between the wheels below the rotational axis of the wheels.

27 Claims, 10 Drawing Sheets

TRAILER SUSPENSION APPARATUS

BACKGROUND OF THE INVENTION

This invention relates to the field of wheel suspensions, and particularly to wheel suspension systems that independently support the wheels of a trailer, semitrailer or other vehicle in which a wide and low cargo floor is desired. This invention is an improvement to the wheel suspension system described in U.S. Pat. No. 4,934,733, issued on Jun. 19, 1990, and U.S. Pat. No. 5,016,912, issued on May 21, 1991, both of which are assigned to the assignee of this invention.

For a variety of reasons, it is desirable to have the cargo floor of a trailer, van or the like as low as reasonably possible. The provision of the low floor provides for more efficient transportation of cargo since the vehicle has a higher load capacity for a given exterior dimension. Easier access to the floor is also obtained when it is placed close to the road surface. These and other advantages of a low cargo floor have motivated the prior art to provide low vehicle floors, although many designs heretofore have not been practical for heavy loads or long-term use.

In U.S. Pat. No. 4,032,167 issued to Chereda on Jun. 28, 1977, there is disclosed a trailer for transporting motorcycles. The Chereda trailer includes a rigid, horizontal frame upon which is mounted a pair of opposed wheels. The two wheels are secured to fixed spindles bolted to the frame. No provision is made for suspending the wheels other than by this rigid attachment, and the Chereda trailer would therefore suffer from the disadvantages of the rigid mounting of the wheels to the load-carrying frame. Devices such as the Chereda trailer have been suitable for light-load applications, but are not practical for heavy use since the rigid attachment of the wheels to the trailer frame causes considerable forces to be transmitted to the frame.

A vehicle suspension is described in U.S. Pat. No. 4,718,692 issued to Raidel on Jan. 12, 1988, in which pairs of pivoting arms support a through axle that extends the width of the vehicle below the vehicle frame. Many such pivoting arm suspensions, as in the Raidel system, have been found applicable to heavy use when incorporating a through axle. See, for example, U.S. Pat. Nos. 3,140,880 to Masser; 3,704,898 to Schmidt; 3,884,502 to Wagner; 4,166,640 to Van Denberg; 4,202,564 to Strader; 4,252,340 to Egging; 4,427,213 to Raidel, Jr.; 4,465,298 to Raidel, Sr.; 4,541,653 to Raidel; 4,580,798 to Roelofs; 4,593,930 to Davis; and 4,615,539 to Pierce.

Some suspension systems dispense with the through axle and provide independent support for each wheel through a pivoting arm. For example, in British patent specification 692,854 to Waters, published on Jun. 17, 1953, a vehicle suspension system is described in which each wheel is carried by a radius arm which is pivotably connected to the vehicle chassis. This pivoting arm concept has been employed in prior devices of varying sophistication. See, for example, U.S. Pat. Nos. 2,507,980 to Knapp; 3,078,104 to Chalmers; 3,356,386 to Taylor; 4,619,578 to Routledge; and 4,666,181 to Wegner. Absent the through axle, however, the pivoting arm devices of the prior art have not been designed to provide adequate strength and stability, particularly in terms of the lateral forces transmitted to the suspension upon turning of the vehicle. Moreover, many of these devices require a good deal of space for the components, which space can be better used for transporting cargo.

There continues to be a need, therefore, for a vehicle suspension apparatus which will permit the floor of the vehicle body to be closer to the road surface. It has further remained desirable to have as compact a suspension as possible to maximize efficient and convenient use of vehicle space and to be substantially flat along the length of the trailer through the wheel region of the trailer.

SUMMARY OF THE INVENTION

Briefly describing one aspect of the present invention, there is provided a wheel suspension system including a wheel support member, mounting means for pivotably mounting the support member to a vehicle frame so that the member is movable between an uppermost position and a lowermost position, a wheel rotatably mounted to the wheel support member, and biasing means for biasing the wheel support member to an intermediate position between the uppermost and lowermost positions, the rotational axis of the wheel being at or above the top surface of the vehicle cargo floor at least when the wheel support member is in the uppermost position. In one important aspect of the invention, mounting means and the biasing means are each disposed to a common side of the rotational axis of the wheel, preferably forward of the wheel according to the direction of travel of the vehicle. In a further aspect of the invention, the wheel support member includes structure for supporting a brake cylinder for operating the braking mechanism of the respectively supported wheel.

The invention also contemplates means for providing lateral support and stabilization to the suspension system which includes an arm engaged between the wheel support member and the vehicle frame. In one feature of the invention, the arm can be a leaf spring that extends generally parallel to the direction of travel of the vehicle, or more precisely parallel to the wheel support member. The suspension system of this invention may be used to support multiple pairs of wheels in a particular vehicle, such as a semi-type trailer. This suspension system, particularly with the novel lateral stabilizer configuration, is also beneficially implemented in a vehicle such as a van to provide a greater amount of cargo space than is available with a conventional van. One such vehicle may be an electric powered van wherein the additional cargo space provided by the inventive suspension system can be used for slidable insertion and support of an array of power cells.

It is an object of the present invention to provide a wheel suspension system which permits the suspended wheel to be in a position with its rotational axis at or above the cargo floor of the vehicle. It is a further object of the present invention to provide a wheel suspension system which is highly compact, and permits a maximum width of cargo space between the suspended wheels.

Another object of the present invention is realized in a wheel suspension system which is reliable and durable, and which is relatively simple in construction. A further object of the present invention is to provide a vehicle having a cargo floor which is relatively close to the ground, and which has maximum width between the rear wheels.

BRIEF DESCRIPTION OF THE DRAWINGS

FIG. 8b is an end schematic representation of the wheel suspension system and means for providing lateral support shown in FIG. 8a.

FIG. 9b is an end schematic representation of the wheel suspension system and means for providing lateral support shown in FIG. 9a.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a wheel suspension system useful in a variety of applications. The system is characterized by having wheels which are mounted independently to a frame, and which are free to move upwardly to a position with the rotational axes of the wheels above the floor of the vehicle. The system is particularly advantageous in that it provides a low profile suspension that permits maximum width of the vehicle floor between the tires, while also permitting the floor of the vehicle to be lower than the axes of rotation for the wheels. The wheel suspension system is useful, for example, for mounting the wheels of a trailer, or for the rear wheels of a front-wheel drive vehicle, such as a van.

Figure 1:
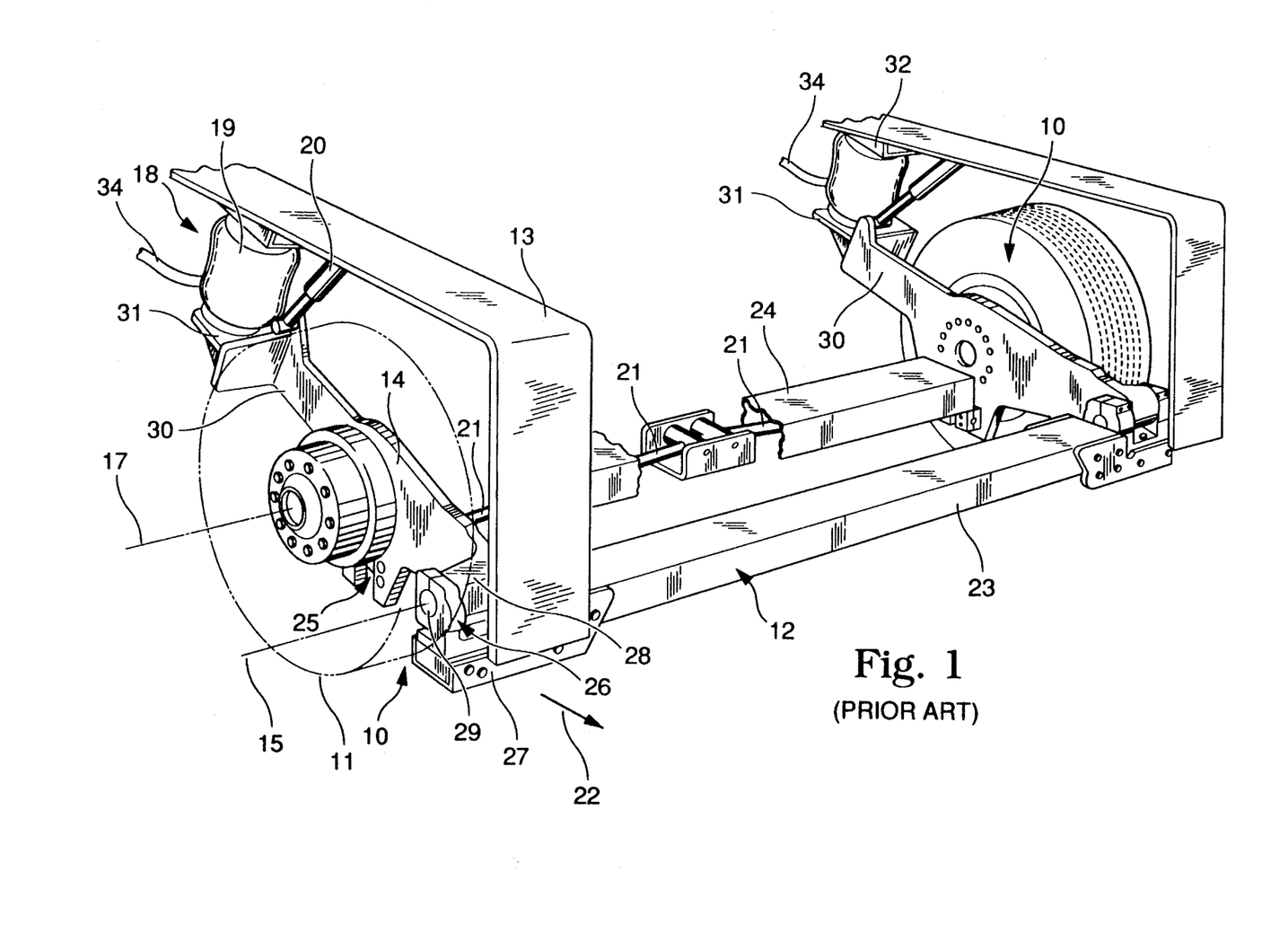
FIG. 1 is an orthographic view showing a pair of wheel suspension systems constructed in accordance with the system described in U.S. Pat. No. 4,934,733.
Figure 2:
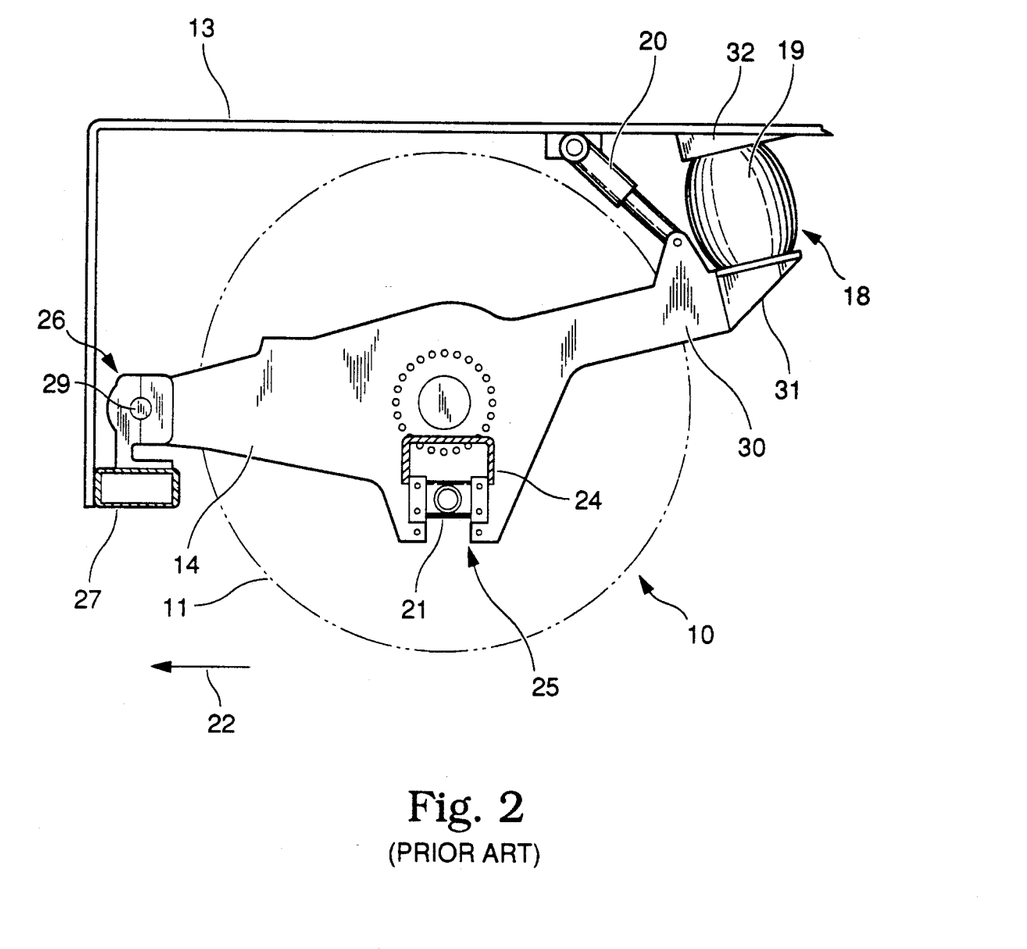
FIG. 2 is a side elevational view of the prior wheel suspension system shown in FIG. 1 as viewed outwardly from the inside wall of the wheel well housing.

Referring in particular to the drawings, there is shown a prior wheel suspension system 10 constructed as described in commonly-owned U.S. Pat. No. 4,934,733, which description is incorporated herein by reference. It is understood that the following description of the system described in the '733 patent is for illustrative purposes and that the details of that system can be gleaned from the '733 patent itself. System 10 is provided for mounting a wheel 11 to the frame 12 of a vehicle. The wheel and suspension system 10 are contained within a wheel well housing 13 constituting part of the frame 12. The suspension system 10 includes a wheel support member 14 attached to the vehicle frame 12 and movable in an arcuate path, generally vertical in direction, about a horizontal pivot axis 15. The wheel 11 is mounted to the wheel support member 14 at the horizontal rotation axis 17, such as by a stub axle arrangement as described in the '733 patent. The wheel 11 is mounted behind the pivot axis 15 of the wheel support member when the vehicle moves in a forward direction 22 and is preferably mounted in about the middle region of the wheel support member 14.

The wheel support member 14 is movable about the pivot axis 15 between a first, uppermost position, and a second, lowermost position. Biasing means 18 are provided for supporting the wheel support member 14 in an intermediate position and for biasing the member to that position. Movement is permitted by the wheel support member 14 in the upward or downward directions, resisted by the biasing means 18. In one embodiment, the biasing means 18 comprises an airbag 19 positioned between a free end of the wheel support member and a portion of the frame 12, such as wheel well housing 13, with compression or extension of the airbag accommodating upward and downward movement, respectively, of the wheel support member.

The mounting of the wheel to the support member and of the support member to the vehicle frame is such that the rotation axis 17 for the wheel is movable to a position vertically above the plane of the vehicle floor. The frame 12 may comprise one large weldment including transverse members, such as 23 and 24, upon which a floor 16 (see FIG. 4) is mounted. In a preferred embodiment, the wheel rotation axis 17 is located above the floor 16 when the wheel support member 14 is in the intermediate position, corresponding to the at-rest position for the vehicle. The suspension system 10 also contemplates that the rotation axis 17 may be at or below the level of the floor 16 in this at-rest position, but would be movable above the level of the floor when the wheel support member moves toward or reaches the uppermost position for the wheel.

This prior suspension system 10 also includes a shock absorber 20 connecting between the wheel support member 14 and the frame or housing 13. Also, a trailer arm 21 connects the wheel support member 14, preferably at a location near the rotational axis of the wheel, with an interior portion of the vehicle frame 12 to provide lateral support and stability. In the system 10, the trailer arm 21 is connected to the wheel support member 14 by a link means 25. The link means 25 is described in more detail in the specification of the '733 patent incorporated by reference, and particularly starting at column 7, line 55.

The wheel support member 14 is a generally flat, elongated member attached at one end to the vehicle frame. Attachment of the wheel support member 14 to the frame 12 may be accomplished in a variety of manners. As shown, the frame 12 includes a transverse member 23 of box tubing enclosed at the ends and supporting the floor 16. Attachment means 26 pivotably connects the member 14 to the transverse member 23. The details of the attachment means 26 of the prior suspension system 10 are described in the '733 patent at column 6, lines 12-30. The means 26 can include an elastomeric bearing component to facilitate and control the pivoting movement of the wheel support member 14.

At the rearward arm portion 30 of the wheel support member 14, there is provided an airbag mounting pad 31. An opposed mounting plate 37 is secured to the housing 13 and the airbag 19 is mounted between plates 31 and 32. In conventional fashion, the airbag 19, at a pre-determined pressure, will maintain the wheel and the wheel support member in a given at-rest or intermediate position relative to the frame. The airbag 19 is connected through air line 34 and via pneumatic control devices (not shown) to a suitable air reservoir for compressed air. In conventional fashion, the air pressure within bag 19 is maintained by the valved communication of the airbag with the air reservoir through line 34.

It is understood that the foregoing brief description of the suspension system of the '733 patent is for reference purposes. Specific references will be made to certain aspects of this prior system used in the preferred embodiments of the system of the present invention. It is further understood that this prior suspension system 10 provides a streamlined independent wheel suspension system that supports the wheel rotation axis at or above the level of the trailer floor. The system 10 also controls vertical movement of the wheel and provides lateral support and stabilization as may be required while the trailer is turning.

Attention is now drawn to FIGS. 3-7 in which an improved suspension system 40 is depicted. In particular, the improved system 40 retains the benefits of the prior system 10, while further streamlining the envelope occupied by the independent wheel suspension components. The improved suspension system 40 supports a wheel 41 relative to a vehicle frame 42. The frame 42 includes a wheel well housing 43 which contains the wheel 41 and many components of the system 40. As in the prior art suspension 10 of FIGS. 1 and 2, the improved suspension system 40 includes a wheel support member 44 which is pivotally mounted about a horizontal pivot axis 45. The wheel 41 is mounted to the wheel support member 44 to rotate about axis 47, such as by a stub axle. The system 40 includes biasing means 48 which in the preferred embodiment includes a resilient member or air bag 49 and a shock absorber 50. Again, as with the prior suspension system 10, the improved system 40 includes means for providing lateral support and stabilization comprising a lateral stabilizer 51 which engages the wheel support member 44 through a link means 55. The opposite end of the lateral stabilizer 51 is connected by way of brackets to transverse members 54 which constitute part of the vehicle frame 42. The vehicle frame 42 also includes a second transverse member 53 which provides additional strength to the vehicle frame 42.

Figure 3:
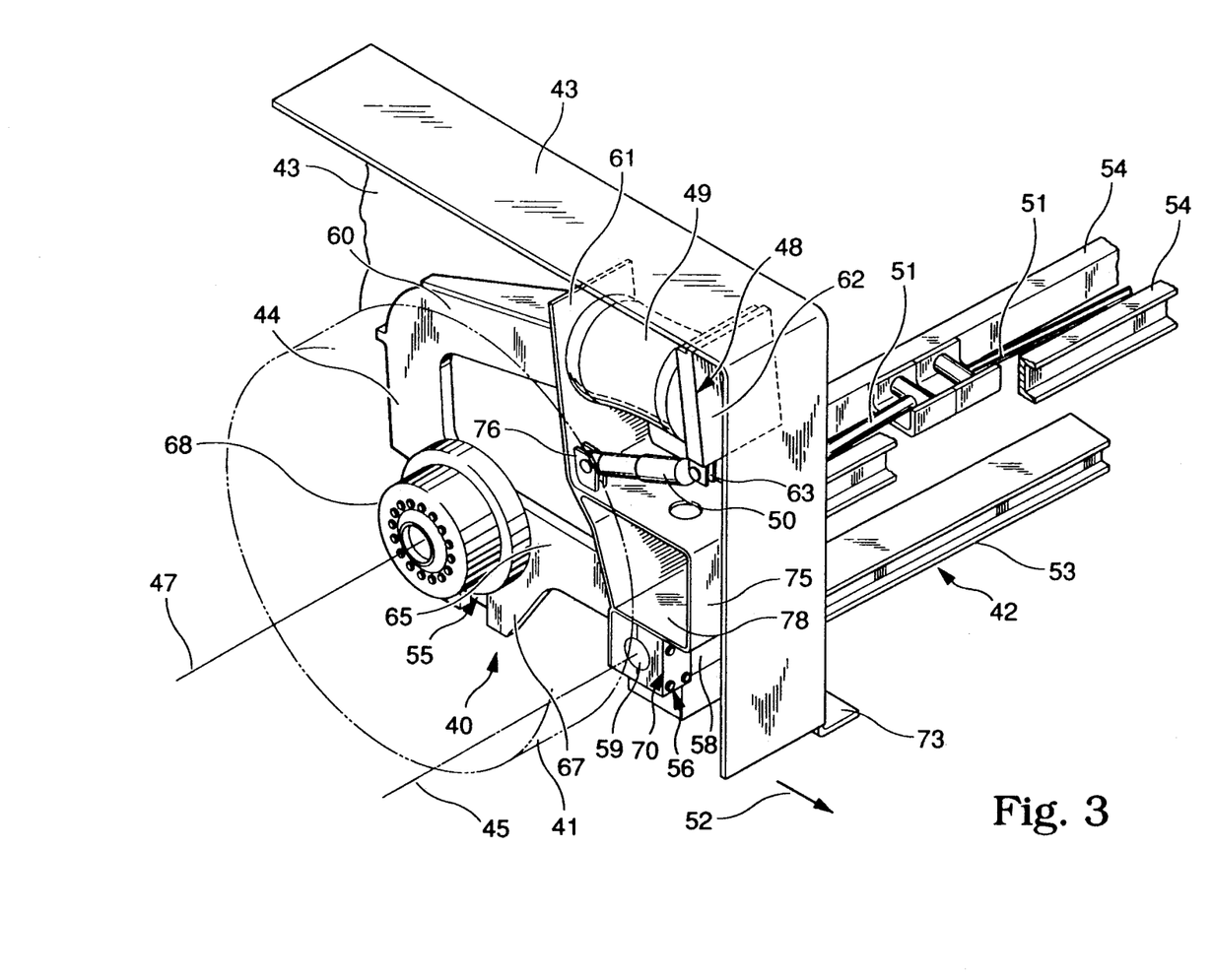
FIG. 3 is an orthographic view of the wheel suspension system of the present invention, particularly showing one such system in the same orientation as the system depicted in FIG. 1.

Attachment means 56 are provided which attaches the wheel support member 44 to the frame 42 and specifically to transverse member 53. Attachment means 56 utilizes a sleeve 58 and pivot shaft 59 which are substantially similar to the like components of the attachment means 26 of the prior system 10 as described above and in the '733 patent incorporated by reference.

As with the prior suspension system, suspension system 40 includes a mounting plate 61 which is integral with the wheel support member 44 and a second mounting plate 62, both of which are used to support the air bag 49 of the biasing means 48. The second mounting plate 62 is attached to the wheel well housing 43 to provide a reaction point as the wheel support member 44 pivots about the horizontal pivot axis 45. The mounting plate 62 also includes a flange 63 for engaging one end of the shock absorber 50. An air line or hose 64 (FIG. 4) is provided to provide air to inflate the air bag 49, as is known in the art.

The suspension system 40 as thus far described is substantially similar to the prior art suspension 10. One important feature of this invention and improvement over the prior system resides in the wheel support member 44. The wheel support member 44 includes a horizontal arm 65 which is connected at its free end to the pivot sleeve 58. The horizontal arm 65 includes a fork portion 67 which is adapted to engage the link means 55 for the lateral stabilizer 51. The wheel hub 68 for the wheel 41 is also mounted to this horizontal arm 65 of the wheel support member 44.

It will be recalled that the wheel support member 14 of the prior art embodiment included a rearward directed reaction arm 30 (with respect to the forward direction 22). In an important aspect of the present invention, the reaction arm 60 which forms part of the wheel support member 44 is forward-directed, in the direction of the arrow 52 shown in FIG. 3 representing the direction of travel of the vehicle. The biasing means 48, and particularly the resilient air bag 49, is situated at the free end of the reaction arm, so that the biasing means 48 and the attachment means 56 are each disposed to a common side of the rotational axis 47 of the wheel, preferably forward of the wheel according to the direction of travel of the vehicle. In addition, both the air bag 49 and the attachment means 56 (about the pivot axis 45) are located outside the diameter of the wheel. In a further aspect, the biasing means 48 is substantially vertically aligned above the pivot axis 45.

This arrangement for the reaction arm 60 provides a different line of force to react the up and down motion of the wheel 41 as the vehicle travels over the road. In particular, as shown in FIG. 2, the prior art suspension system provides a substantially vertical line of force through the biasing means 18 to react the vertical motion of the wheel. On the other hand, with the present invention, the line of force through the biasing means 48 is nearly horizontal or parallel to the direction of travel 52. Thus, as the wheel 41 translates vertically the wheel support member 44 pivots about the sleeve 58 and shaft 59 (particularly axis 45), which in turn causes the reaction arm 60 to compress or expand the biasing means 48 along a line parallel to the longitudinal extension of the reaction arm 60. It has been found that this particular arrangement for the wheel support member provides a more efficient reaction of the loads exerted on the wheel 41.

Moreover, and possibly more significantly, this U-shaped configuration of the wheel support member, in which the reaction arm 60 extends nearly horizontally forward, reduces the space required for the improved suspension 40 of FIG. 3 over the prior suspension system 10 of FIG. 2. Having reduced the envelope required for the individual wheel suspension systems, the wheels of a multi-wheel vehicle can be placed closer to each other, or the space between the wheels be more gainfully occupied in housing other equipment.

Figure 5:
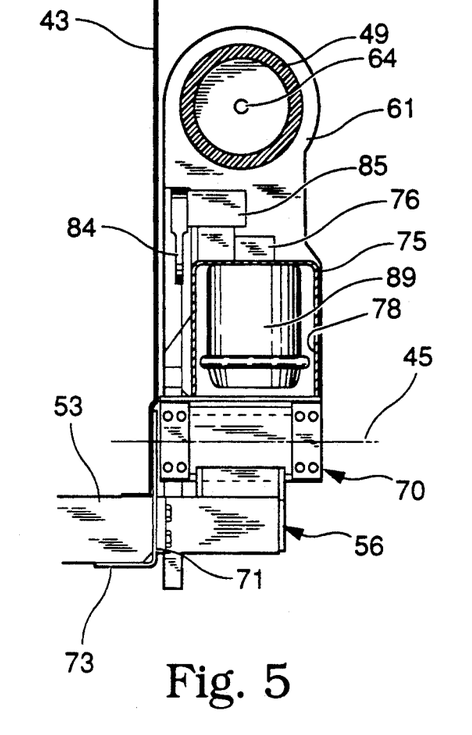
FIG. 5 is a partial cross-sectional end view showing the attachment of the wheel support member to the vehicle frame as well as components of the brake assembly, taken along line 5—5 in FIG. 4 as viewed in the direction of the arrows, with some components removed for clarity.
Figure 7:
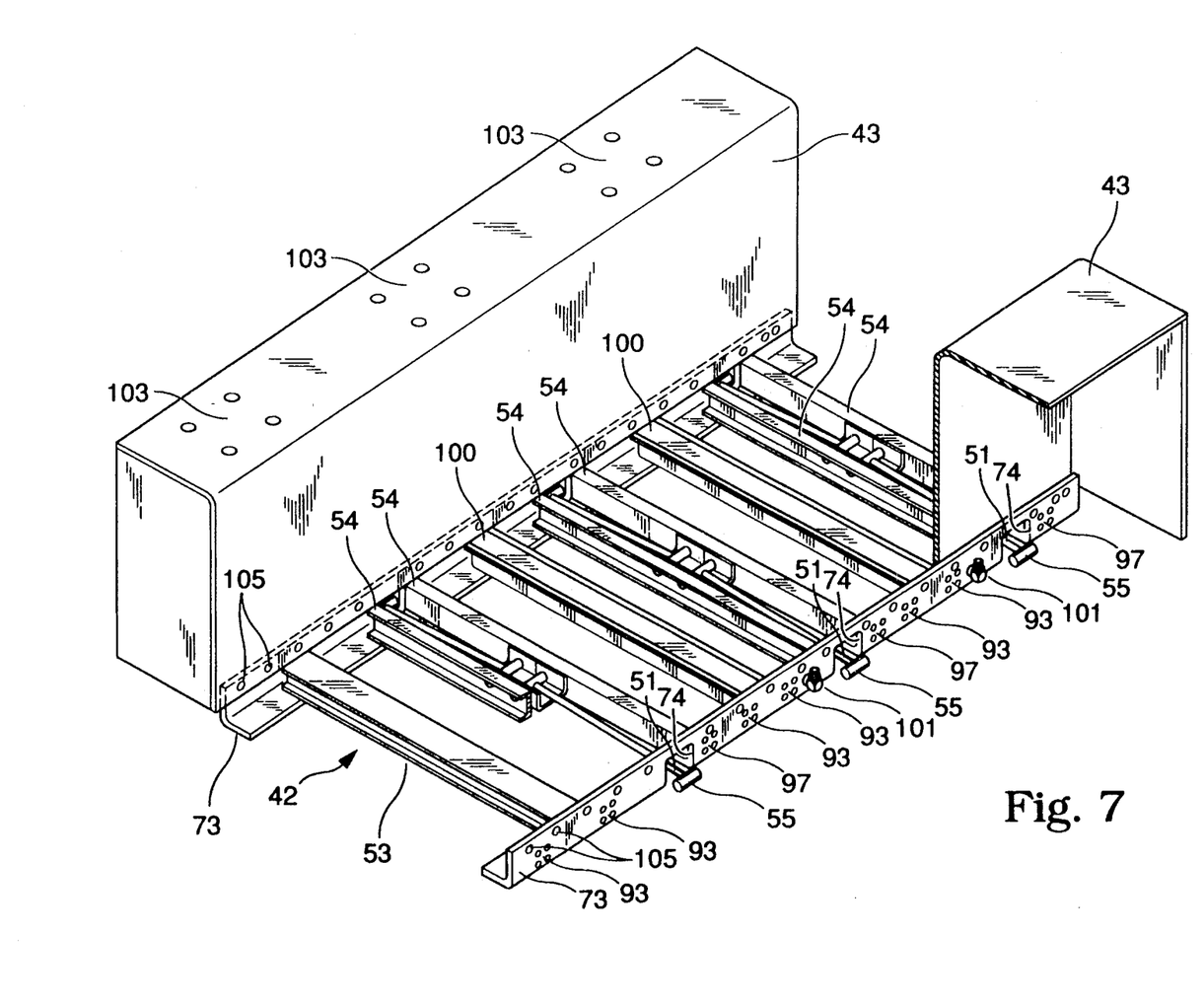
FIG. 7 is an orthographic view showing the vehicle frame, a trailing arm with the wheel well housing of the suspension system in FIG. 3 shown intact, and the wheel well housing on the opposite side of the frame partially cut away for clarity.

A pivot bearing support 70 is provided to mount the wheel support member 44 to the frame by way of the sleeve 58, which is connected to the member 44, and shaft 59, which extends through the sleeve. The pivot bearing support 70 includes a pair of mounting flanges 71 which are used to attach the attachment means 56 to the vehicle frame. In particular, the mounting flanges 71 for the pivot bearing support 70 are affixed to a longitudinal angle beam 73, which is shown more clearly in FIG. 7. As shown in FIG. 7, the vehicle frame 42 includes a pair of longitudinal angle beams 73 across which the transverse members 53 and 54 are attached. Each longitudinal beam 73 includes a pair of mounting pads 93 which straddle one transverse member 53 to provide a surface for engaging the mounting flanges 71 of the pivot bearing support 70. As shown in FIG. 5, the mounting flanges 71 can be bolted to the longitudinal angle beam 73 in a conventional manner.

In another novel aspect of the improved suspension 40 of the present invention, the wheel support member 44 includes a casing 75 which in the preferred embodiment is welded to the U-shaped arms 60 and 65 of the support member 44. The casing 75 includes a shock absorber mounting bracket 76 so that the shock absorber is fixed at one end to the movable component (support member 44) by way of bracket 76 and at the other end to the fixed reaction component (wheel well housing 43) by way of bracket 63.

Figure 4:
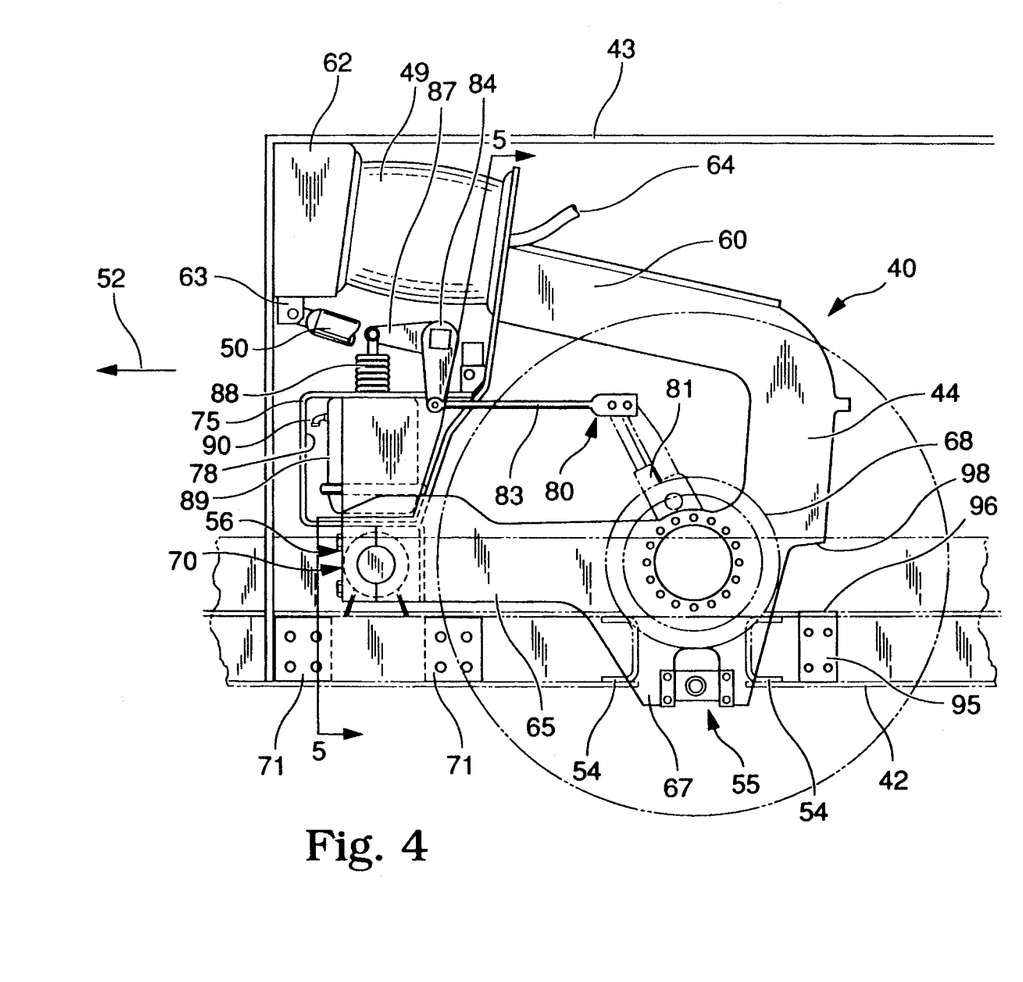
FIG. 4 is a side elevational view of the inventive wheel suspension system shown in FIG. 3.

The casing 75 forms a cylinder housing 78 as shown in FIGS. 3 and 4, which is adapted to contain a brake cylinder unit 89 disposed therein. The brake cylinder unit 89 forms part of a brake assembly 80, shown in more detail in FIG. 4-6. The brake assembly 80 includes a brake shoe assembly 81 which is engaged around the wheel hub in a conventional manner. An actuator rod 82 extends from the brake pad assembly to engage a linkage 83. One end of the linkage 83 is connected to a pivot arm 84 which is itself pivotably supported by an axle 86 extending through an axle housing 85 (see FIG. 6). The other end of the axle 86 is attached to a control arm 87 which is pivotable relative to the axle housing 85 by the actuation of a reciprocating arm 88 which is the actuator component of the brake cylinder unit 89 as it translates up and down in response to fluid pressure provided to the cylinder through pressure inlet fitting 90. Stroking arm 88 actuates rod 82 to open or close the brake shoes of the assembly 81 in a conventional manner.

Figure 6:
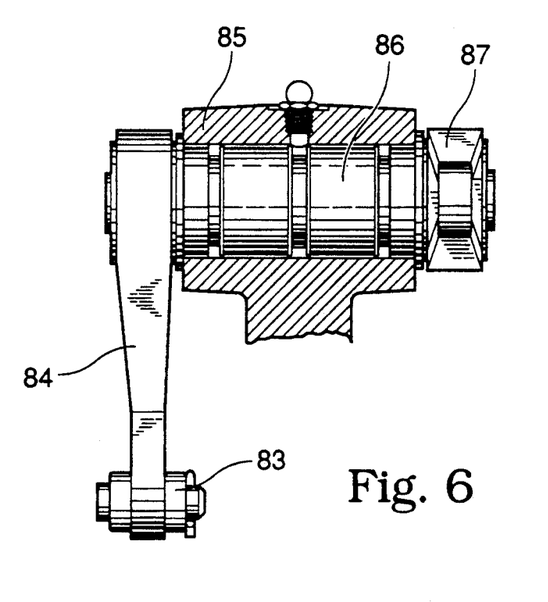
FIG. 6 is cutaway cross-sectional view of the axle housing and control components of the brake assembly shown in FIG. 4.

While brake assemblies, such as brake assembly 80, are known in the art, the present invention provides a novel method for combining the brake assembly 80 with the wheel support member 44 for each individual wheel. In particular, the implementation of the cylinder housing 78 and casing 75 provides support for the brake cylinder unit 89, as well as a reaction surface (axle housing 85) for actuation of the brake assembly components. It should be understood that the brake assembly, including the brake shoe assembly 81 and the brake cylinder unit 89, will move together with the wheel support member 44 as it rotates about pivot axis 45.

In a further novel aspect of the improved suspension 40 of the present invention, the vehicle frame 42 is modified to include a pair of hydraulic tanks 100 spanning transversely between the longitudinal angle beams 73, as shown in FIG. 7. The hydraulic tanks 100 each include an outlet 101 to which appropriate pressure tubes can be fitted to provide hydraulic pressure to the pressure fittings 90 of the brake cylinder units 89 for each wheel of a multi-wheeled vehicle. Outlet 101 can be supported by angle beams 73. In this manner, separate hydraulic tanks or reservoirs are not required for each brake cylinder unit. Instead, one or more common hydraulic tanks, such as tanks 100, can be provided to more efficiently distribute hydraulic pressure to each of the brake cylinder units 89. The hydraulic tanks 100 can be integrated into a conventional hydraulic circuit for controlling the operation of the vehicle brakes.

Referring again to FIG. 7, the longitudinal angle beam 73 includes a number of mounting pads or mounting positions for engaging various components of the suspension system 40. The mounting pads 93 have been discussed as providing a mounting surface for the pivot bearing mounting flanges 71. Also included is a mounting pad 97 to which a stop 95 is engaged. As shown more clearly in FIG. 4, the stop 95 includes a stop surface 96 which limits the downward motion of the wheel support member 44. In particular, edge 98 of the horizontal arm 65 contacts the stop surface 96 of the stop 95 when the vehicle wheel 41 moves vertically downward a predetermined distance. The angle beam also includes a number of bolt openings 105 for attachment of the wheel well housing 43 to the longitudinal angle beams 73. The wheel well housings 43 also include a multiple mounting pads 103 for attachment of the second mounting plate 62 to which the air bag 49 is engaged. Openings 74 are provided in the beam 73 through which the lateral stabilizers 51 for each wheel extend for attachment to the lower fork portion 67 of the wheel support member 44.

Figure 8A:
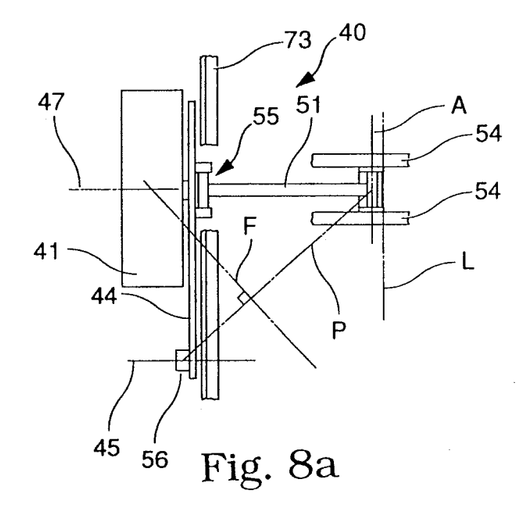
FIG. 8a is a top schematic representation of the wheel suspension system of FIG. 3, particularly showing the arrangement of the means for providing lateral support.
Figure 8B:
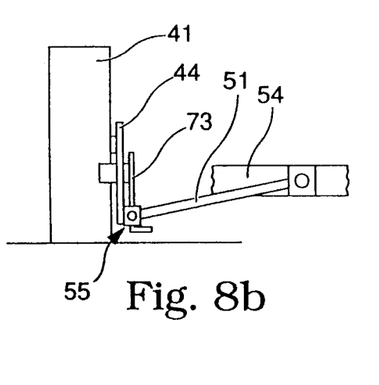

Referring now to FIGS. 8A and 8B, a schematic representation of the lateral stabilizer aspect of the improved suspension system 40 is illustrated. In particular, FIG. 8A represents a top view looking down onto the suspension system which shows the wheel 41 being mounted to the wheel support member 44 about a rotation axis 47. The wheel support member is pivotably mounted to the vehicle frame by attachment means 56 along pivot axis 45. The vehicle frame includes transverse members 54 and longitudinal angle beam 73. As shown in the figure, the lateral stabilizer 51 is connected at one end to the transverse beams 54 and at the other end to the wheel support member 44 by way of link means 55. The line L represents the longitudinal axis of the vehicle. It should be apparent that another wheel and lateral stabilizer arm is present on the opposite side of the longitudinal axis of the vehicle.

In FIG. 8A, a line P is shown between the pivot points of the wheel support member 44 and the lateral stabilizer 51 as representing the effective pivot axis of the wheel. It is understood in the operation of the wheel suspension system of this embodiment that as the wheel 41 moves vertically, the wheel support member 44 pivots about axis 45. Likewise, lateral stabilizer 51 pivots at one end about an axis A running parallel to the longitudinal axis L. In addition, the other end of the lateral stabilizer 51 must pivot at the link means 55 at the wheel support member 44. Unless the lateral stabilizer 51 in this embodiment is pivotably mounted at both ends, any vertical displacement of the wheel would result in a lateral force being exerted on the wheel support member 44 as the wheel attempts to pivot around the effective pivot axis P.

Figure 9A:
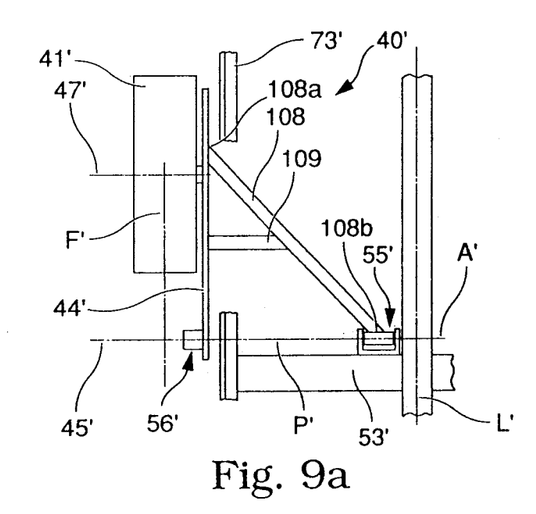
FIG. 9a is a top schematic representation of a wheel suspension system in accordance with the system of FIG. 3 but incorporating a means for providing lateral support of another aspect of the present invention.
Figure 9B:
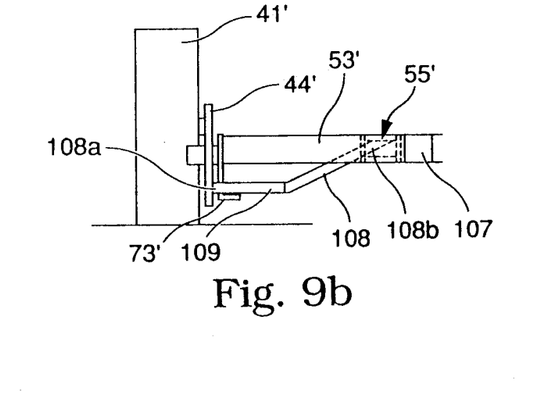

In order to alleviate this condition, a further embodiment of the present invention, shown in FIGS. 9A and 9B, provides a different line of action or effective pivot axis for the wheel deflection. In particular, in the alternative embodiment illustrated in FIGS. 9A and 9B, like components are to the embodiment in FIGS. 8A and 8B are similarly numbered with a "prime" designation. For instance, wheel 41', wheel plate 44' and longitudinal angle beams 73' are identical to the components 41, 44 and 73, respectively, of FIGS. 8A and 8B. In addition, transverse member 53' is identical to the transverse member 53 illustrated in FIG. 3. As depicted in these FIGS. 8A and 8B, the lateral stabilizer 51 has been replaced by a lateral stabilizer arm 108 and crossbar 109. The lateral stabilizer arm 108 is fixed to the wheel support member 44 at one end 108a, preferably by welding. Likewise, the crossbar 109 is welded at one end to the wheel support member 44 and the other end to the lateral stabilizer arm 108. The opposite end of the stabilizer arm 108, or end 108b, is mounted to the transverse member 53' by way of link means 55', which can be substantially similar to the link means 55 of the prior embodiment. A second longitudinal beam 107 can be provided along the longitudinal axis L' of the vehicle to provide additional support for the vehicle frame.

As can be seen from FIG. 9A, the pivot axis A' of the link means 55' for the end 108b of the stabilizer arm 108 is coincident with the pivot axis 45' of the wheel support member 44. An effective pivot axis P' extends between these two points. In this embodiment the right angle line of action of the wheel deflection force F' passes through the wheel 41' parallel to the wheel support member 44' and perpendicular to the axis P' at a point outside the member 44'. Thus, as the wheel 41' deflects vertically its tendency is to pivot about effective axis P' so that the line of force F' has no lateral component. One benefit of this arrangement of lateral stabilizer arm 108 is that only one end of the arm 108 need be pivotably mounted. The first end 108a of the arm can be rigidly fixed to the wheel support member 44'. As the wheel 41' moves vertically and the wheel support member 44' rotates about pivot axis 45', the lateral stabilizer arm 108 freely pivots around axis A' at link means 55'. Consequently, the operation of a suspension system 40' does not exert any additional side load to the wheel support member 44'.

As can be seen from FIG. 9B, the lateral stabilizer arm 108 is straight from 108a to the welded connection of crossbar 109. The arm 108 then bends upward to end 108b where the arm is connected to the transverse member 53'. It is believed that this arrangement provides a greater distribution of lateral forces that might be exerted on the wheel 41', without adding additional lateral force to the wheel and wheel support member 44' by operation of the suspension system and lateral stabilizer itself.

Figure 10:
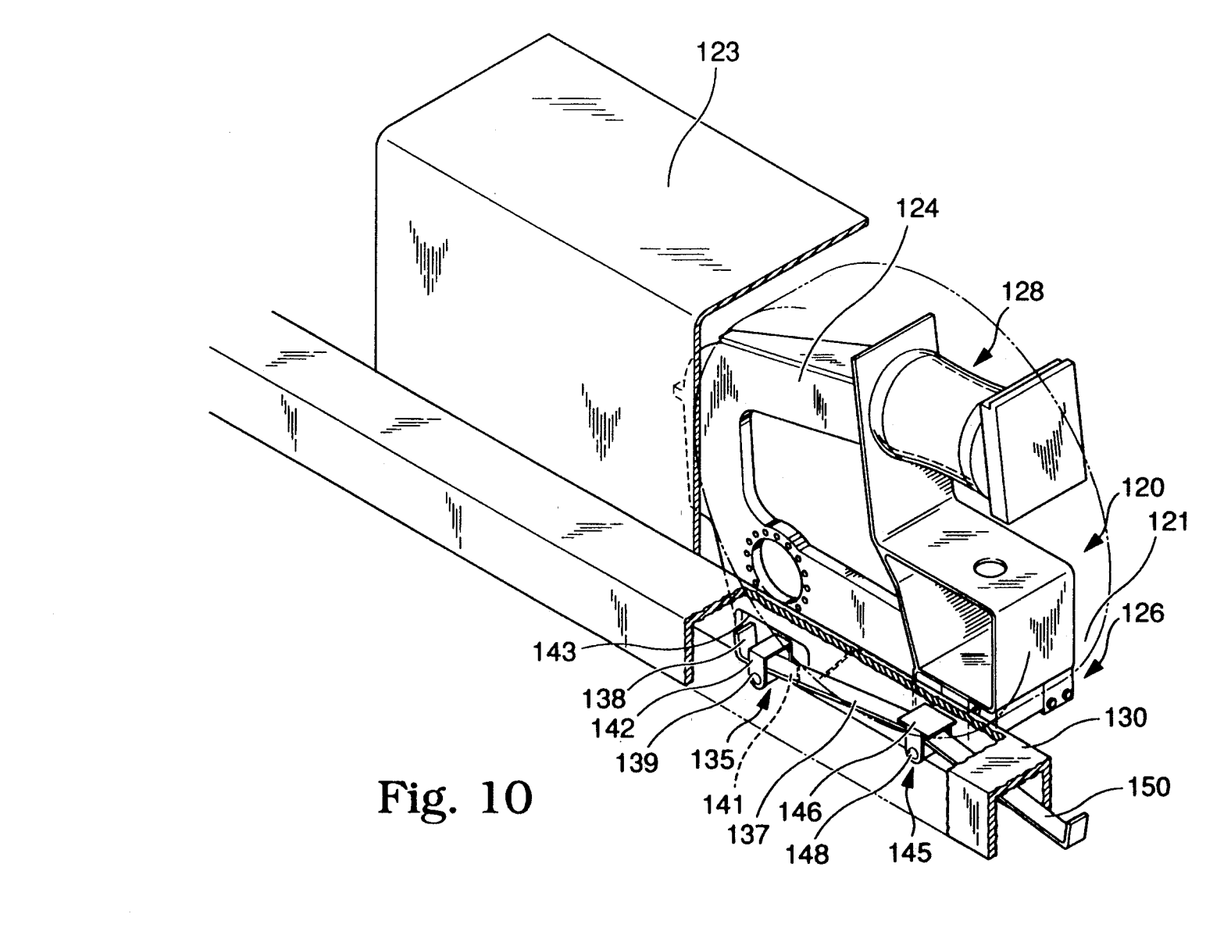
FIG. 10 is an orthographic view of the wheel suspension system shown in FIG. 3 oriented on the opposite side of the vehicle frame and including the means for providing lateral support of another aspect of the present invention, with the vehicle frame and wheel well housing partially cut away for clarity.
Figure 11:
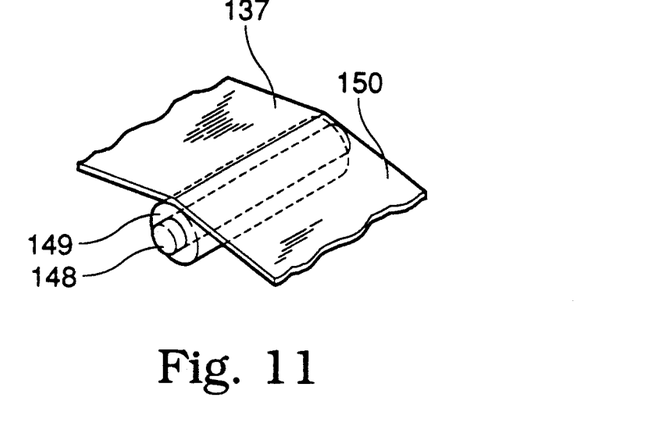
FIG. 11 is a detail perspective view of the mounting hinge for use with the means for providing lateral support shown in FIG. 10.
Figure 12:
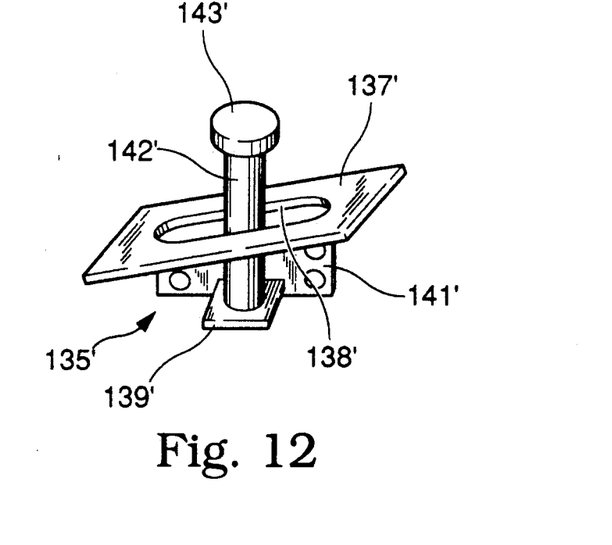
FIG. 12 is a detail orthographic view of an alternative connection between the lateral support means and the wheel support member.

Referring now to FIGS. 10-12, a further embodiment of a lateral stabilizer for use with the wheel suspension system of the present invention is illustrated. In particular, a suspension system 120 is provided which is substantially similar to the wheel suspension system 40 of a prior embodiment. The system supports a wheel 121 within a wheel well housing 123. A wheel support member 124 is provided which is pivotably mounted by attachment means 126 to the frame of the vehicle, and in particular to longitudinal beam 130. Biasing means 128 are also provided which reacts the motion of the wheel support member 124 against the wheel well housing 123.

Referring now specifically to the present embodiment, means for providing lateral support and stabilization 135 is provided which includes a leaf spring 137. One end of the leaf spring 137 passes through a guide fitting 139 which is attached to a lower mounting portion 140 of the wheel support member 124 by way of a mounting flange 141. The guide fitting 139 can be in the form of a U-shaped bracket in one or multiple pieces, provided the guide fitting 139 includes a lateral retainer member 142 which restrains or contains the leaf spring 137 in close proximity to the wheel support member 124. The leaf spring 137 can be provided with a bend portion 138 at its end to keep the leaf spring 137 from sliding out of the guide fitting 139 as the wheel 121 moves in a vertical direction. A cut-out 143 is provided in the longitudinal beam 130 to allow connection between the guide fitting 139 and the lower mounting portion 140 of the wheel support member 124.

The opposite end of the leaf spring 137 is engaged to a mounting hinge 145. The mounting hinge 145 includes a mounting pad 146 which is adapted to be attached to the inside surface of the longitudinal beam 130 in a conventional manner. As shown more particularly in the detail view of FIG. 11, the mounting hinge 145 includes a spindle 148 passing through a collar 149. The ends of the spindle 148 are retained within the mounting hinge. The leaf spring 137 is affixed to the collar 149, preferably by welding.

In the operation of the lateral stabilizer means 135 of the present embodiment, as the vehicle wheel 121 moves up and down and the wheel support member 124 rotates about the pivot axis of the attachment means 126, the guide fitting 139 also moves vertically. As the guide fitting 139 moves vertically, the leaf spring 137 slides within the guide fitting, or more specifically the guide fitting moves relative to the leaf spring. In this manner, the leaf spring adds no appreciable resistance to the vertical motion of the wheel 121, that aspect being left to the wheel biasing means 128. However, should the wheel move laterally, the leaf spring 137 will contact either the wheel support member 124 as the wheel 121 moves inboard, or the lateral retainer member 142 of the guide fitting 139 as the wheel moves outwardly from the longitudinal beam 130.

In another aspect of this embodiment of the invention, the lateral stabilizer means 135 can include not only a first leaf spring 137, but a second leaf spring 150 which may be integral and which is also attached to the collar 149 of the mounting hinge 145. This second leaf spring 150 can be directed forward to engage the guide fitting of a second wheel. On the other hand, the second leaf spring 150 can be eliminated and separate lateral stabilizer means 135 provided for each of the individual wheels of the vehicle.

In an alternative embodiment shown in FIG. 12, a lateral stabilizer means 135' includes a leaf spring 137' having a slot 138' defined therethrough adjacent the free end of the spring. The slot 138' is configured to accept a post 142' extending therethrough. The post 142' is affixed to a plate 139' forming part of a bracket 141' which is mounted to the wheel support member 124. The post 142' has an enlarged head 143' at its end which prevents the post from escaping from the slot 138'. The slot 138' is closely fit around the post 142' so that any lateral movement of the wheel support member causes the post to immediately contact the leaf spring 137', which reacts the lateral force in the same manner as the leaf spring 137 described above. The length of the slot 138' is calibrated to accommodate the vertical movement of the wheel which flexes the spring 137' as either the plate 139' or enlarged head 143' contact the leaf spring.

One important benefit of the lateral stabilizer means 145 of the present embodiment is that the lateral stabilization is restricted to a region immediately adjacent the wheel 121 and its suspension system 120. This is in contrast to the lateral stabilizer arms 51 and 108 of the previous embodiments which are attached to the vehicle frame at a point near the midline longitudinal axis of the vehicle. It has been found that with this implementation of the lateral stabilizer means 135, adequate lateral rigidity and stabilization is provided to the wheel 121, without infringing into the interior region of the vehicle itself.

For instance, in one specific embodiment, a van 155 shown in FIG. 12 can be provided which includes a cargo section 156 bounded by a floor 157. A wheel well housing 160 is provided to house the wheel and suspension system in accordance with any of the embodiments of the present invention. A longitudinal beam 162 is provided which is substantially similar to the beam 130 shown in FIG. 10. Offset from the floor 157 is a lower body panel 164 which is adjacent the road and sits below the axle of the wheels 158 of the vehicle. Since the van 155 incorporates the suspension 120 shown in FIG. 10, as well as the lateral stabilizer means 135 in the same figure, no component of the suspension system extends beyond or inboard of the longitudinal beam 162. Thus, a lower cargo section 167 is provided between the floor 157 and the lower body panel 164, and between the longitudinal beams 162 on opposite sides of the vehicle. A second longitudinal lower frame member 165 can be provided directly beneath the longitudinal beam 162 and extending along the length of the vehicle.

Figure 13:
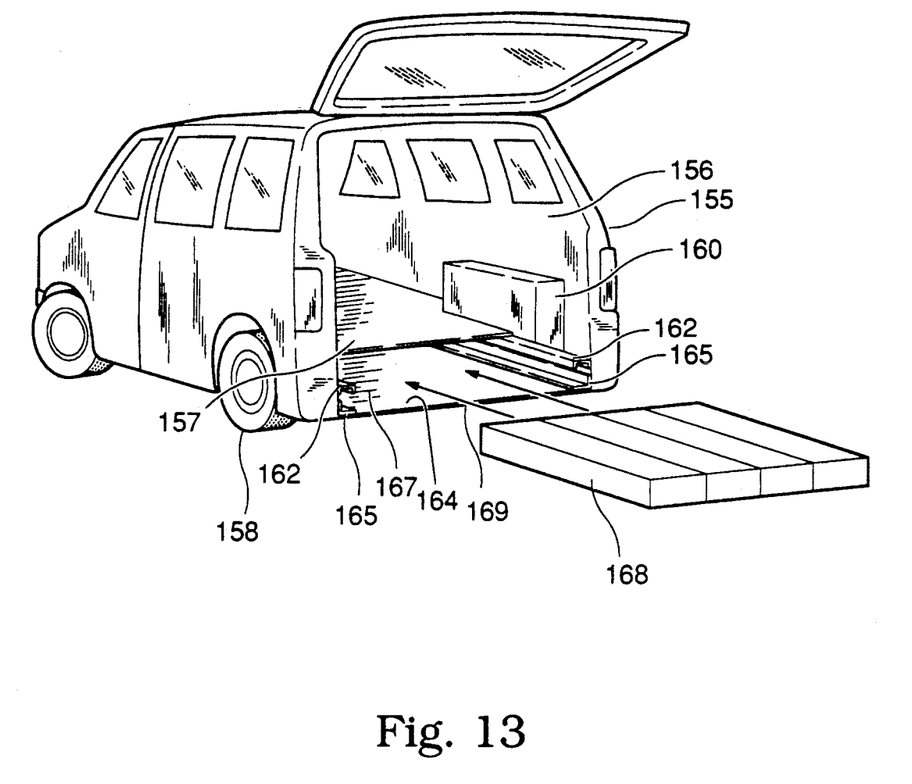
FIG. 13 is an orthographic view of a vehicle incorporation the wheel suspension system and lateral support means as depicted in FIGS. 10-12 particularly showing the increased cargo space available with the system for insertion of an array of power cells, such as a battery pack for an electric powered van.

The van 155 of this specific embodiment can be powered by a renewable energy source which can be contained within the lower cargo section 167. More specifically, an array of power cells such as battery pack 168 can be inserted in direction 169 into the lower cargo section 167 to provide energy to an electric motor powering the vehicle. The van 155 is preferably an electric vehicle having a front wheel drive system. It is thus seen that the electric van 155 of the present embodiment provides means for receiving a sliding battery pack 168 without infringing into the cargo space available in the van from that available in a standard van. The use of suspension system 120 and lateral stabilizer means 135 permits this beneficial feature since all of the wheel support components are located outboard and are restricted to a plane that is generally parallel to the side walls and offset from the longitudinal axis of the vehicle. It is envisioned that the battery pack 168 itself can be configured to provided some transverse stabilization, such as by a separate frame for the battery pack which is attached to the longitudinal beams 162 and 165 of the vehicle.

While the invention has been illustrated and described in detail in the drawings and foregoing description, the same is to be considered as illustrative and not restrictive in character, it being understood that all changes and modifications that come within the spirit of the invention are desired to be protected.

For instance, while only one suspension system 40 according to this invention has been depicted in the figures, it is understood that each wheel of a vehicle includes its own individual suspension system. Thus, a semi-type trailer having three pairs of wheels, for example, will have six suspension systems such as systems 40, one for each wheel. Nevertheless, the addition of wheels to the vehicle does not significantly impact the cargo space available in the semi-trailer because of the very streamlined envelope occupied by the suspension system 40 of this invention. The floor of the cargo compartment of the semi-trailer can be situated at or below the rotational axis of the wheels using the suspension system 40 shown in FIG. 3, or even lower using the compact lateral stabilizer means 135 shown in FIG. 10.

What is claimed is:

1. A wheel suspension system for mounting a wheel to the frame of a vehicle adjacent a floor of the vehicle, which comprises:
   a wheel support member;
   a wheel mounted to said wheel support member for rotation about a horizontal rotation axis;
   attachment means for attaching said wheel support member to a vehicle frame to be pivotable about a horizontal pivot axis displaced from said rotation axis of said wheel to move said wheel vertically between a first, uppermost position and a second lowermost position;
   means for providing lateral support to said wheel connected between the vehicle frame and said wheel support member at a location displaced from said rotation axis and the pivot axis; and
   biasing means for biasing said wheel support member to an intermediate position between the uppermost and lowermost positions and permitting resisted movement away from the intermediate position, said biasing means including a resilient member positioned between opposed surfaces of said wheel support member and the vehicle frame,
   wherein the resilient component and the pivot axis are both positioned to the same side of the rotation axis of the wheel relative to the forward direction of travel of the vehicle.

2. The wheel suspension system of claim 1, wherein said resilient component and said pivot axis are both positioned forward of said rotation axis of the wheel.

3. The wheel suspension system of claim 1 in which said wheel has a diameter and in which the resilient component and the pivot axis are both located outside of the diameter of said wheel.

4. The wheel suspension system of claim 1 in which the resilient component is substantially vertically aligned above the pivot axis.

5. The wheel suspension system of claim 1 in which the resilient component comprises an air bag.

6. The wheel suspension system of claim 5 in which said biasing means further includes a shock absorber connecting between said wheel support member and the vehicle frame and substantially vertically aligned above the pivot axis.

7. The wheel suspension system of claim 1 in which said biasing means is arranged to operate between said opposed surfaces in a substantially horizontal direction parallel to the longitudinal axis of the vehicle.

8. The wheel suspension system of claim 1 in which said wheel support member includes a generally U-shaped plate defined by a pair of integral arms, one of said arms connected at its respective free end to said attachment means and the other of said arms having one of said opposed surfaces at its respective free end.

9. The wheel suspension system of claim 1 and which further includes:
a second wheel support member;
a second wheel mounted to said second wheel support member for rotation about a second horizontal rotation axis;
second attachment means for attaching said second wheel support member to the vehicle frame to be pivotable about a second horizontal pivot axis displaced from said second rotation axis of said second wheel to move said second wheel vertically between a first, uppermost position and a second, lowermost position;
second means for providing lateral support to said second wheel connected between the vehicle frame and said second wheel support member at a location displaced from said second rotation axis and the second pivot axis; and
second biasing means for biasing said second wheel support member to an intermediate position between the uppermost and lowermost positions and permitting resisted movement away from the intermediate position, said second biasing means including a second resilient member positioned between opposed surfaces of said second wheel support member and the vehicle frame,
wherein the second resilient component and the second pivot axis are both positioned to the same side of the second rotation axis of the second wheel relative to the direction of travel of the vehicle.

10. The wheel suspension system of claim 9 in which each said wheel has a diameter and in which the respective resilient component and the respective pivot axis are both located outside of the diameter of said wheel.

11. The wheel suspension system of claim 9 in which each of the resilient components is substantially vertically aligned above the respective pivot axis.

12. The wheel suspension system of claim 9 in which each of the resilient components comprises an air bag.

13. The wheel suspension system of claim 9 in which each of the biasing means is arranged to operate between respective opposed surfaces in a substantially horizontal direction parallel to the longitudinal axis of the vehicle.

14. The wheel suspension system of claim 9 in which the respective pivot axis of each of the attachment means are longitudinally displaced from each other.

15. A wheeled vehicle for movement along a support surface, which comprises:
a vehicle body including a vehicle frame and a planar floor supported by said frame;
a wheel support member;
a wheel mounted to said wheel support member for rotation about a horizontal rotation axis;
attachment means for attaching said wheel support member to the vehicle frame to be pivotable about a horizontal pivot axis displaced from the rotation axis of said wheel to move said wheel vertically between a first, uppermost position and a second, lowermost position, the rotation axis of said wheel being vertically above the floor when said wheel support member is in its uppermost position;
means for providing lateral support to said wheel connected between the vehicle and said wheel support member at a location displaced from said rotation axis and said pivot axis; and
biasing means for biasing said wheel support member to an intermediate position between the uppermost and lowermost positions and permitting resisted movement away from the intermediate position, said biasing means including a resilient member positioned between opposed surfaces of said wheel support and the vehicle frame,
wherein the resilient component and the pivot axis are both positioned to the same side of the rotation axis of the wheel relative to the forward direction of travel of the vehicle.

16. A wheeled vehicle for movement along a support surface, which comprises:
a vehicle body including a vehicle frame and a planar floor;
a wheel support member;
a wheel mounted to said wheel support member for rotation about a horizontal rotation axis;
attachment means for attaching said wheel support member to the vehicle frame to be pivotable about a horizontal pivot axis displaced from the rotation axis of said wheel to move said wheel vertically between a first, uppermost position and a second, lowermost position;
means for providing lateral support to said wheel connected between the vehicle frame and said wheel support member at a location displaced from said rotation axis and said pivot axis;
biasing means for biasing said wheel support member to an intermediate position between the uppermost and lowermost positions and permitting resisted movement away from the intermediate position; and
a brake assembly including;
braking means for braking the rotation of the wheel;
an actuator;
linkage means connected between said actuator and said means for braking for actuating said braking means in response to said actuator; and
means for supporting said actuator on said wheel support member so that said actuator and said linkage means moves with said wheel support member as said member pivots about said pivot axis.

17. The wheeled vehicle of claim 16 in which said actuator is a hydraulic actuator and in which said brake assembly includes;
- a reservoir of hydraulic fluid displaced from said actuator; and
- means for fluid communication of said reservoir to said actuator.

18. The wheeled vehicle of claim 16, wherein said reservoir is mounted within the vehicle frame beneath said floor.

19. The wheeled vehicle of claim 16 further comprising:
- a second wheel support member;
- a second wheel mounted to said second wheel support member for rotation about a second horizontal rotation axis;
- second attachment means for attaching said second wheel support member to the vehicle frame to be pivotable about a second horizontal pivot axis displaced from said second rotation axis of said second wheel to move said second wheel vertically between a first, uppermost position and a second, lowermost position;
- second means for providing lateral support to said second wheel connected between the vehicle frame and said second wheel support member at a location displaced from said second rotation axis and the second pivot axis;
- second biasing means for biasing said second wheel support member to an intermediate position between the uppermost and lowermost positions and permitting resisted movement away from the intermediate position; and
- a second brake assembly including;
  - second braking means for braking the rotation of the second wheel;
  - a second actuator;
  - second linkage means connected between said second actuator and said second means for braking for actuating said second braking means in response to said second actuator; and
  - means for supporting said second actuator on said second wheel support member so that said second actuator and said second linkage means moves with said second wheel support member as said second member pivots about said second pivot axis.

20. The wheeled vehicle of claim 19 in which said actuator and said second actuator are hydraulic actuators and in which said brake assemblies include a common reservoir of hydraulic fluid displaced from each of the actuators, and means for fluid communication of the common reservoir to each of the actuators.

21. A wheel suspension system for mounting a wheel to the frame of a vehicle adjacent the floor of the vehicle, which comprises:
- a wheel support member;
- a wheel mounted to said wheel support member for rotation about a horizontal rotation axis;
- attachment means for attaching said wheel support member to the vehicle frame to be pivotable about a horizontal pivot axis displaced from the rotation axis of said wheel to move said wheel vertically between a first, uppermost position and a second, lowermost position, the rotation axis of said wheel being vertically above the floor when said wheel support member is in its uppermost position;
- means for providing lateral support to said wheel connected between the vehicle frame and said wheel support member at a location displaced from said rotation axis and said pivot axis;
- biasing means for biasing said wheel support member to an intermediate position between the uppermost and lowermost positions and permitting resisted movement away from the intermediate position; and
- a brake assembly including;
  - braking means for braking the rotation of the wheel;
  - an actuator;
  - linkage means connected between said actuator and said means for braking for actuating said braking means in response to said actuator; and
  - means for supporting said actuator on said wheel support member so that said actuator and said linkage means moves with said wheel support member as said member pivots about said pivot axis.

22. The wheel suspension system of claim 21 in which said actuator is a hydraulic actuator and in which said brake assembly includes means for fluid communication of said actuator to a reservoir of hydraulic fluid.

23. A wheel suspension system for mounting a wheel to the frame of a vehicle adjacent a floor of the vehicle having a longitudinal axis, which comprises:
- a wheel support member;
- a wheel mounted to said wheel support member for rotation about a horizontal rotation axis;
- attachment means for attaching said wheel support member to a vehicle frame to be pivotable about a horizontal pivot axis displaced from said rotation axis of said wheel to move said wheel vertically between a first, uppermost position and a second, lowermost position;
- biasing means for biasing said wheel support member to an intermediate position between the uppermost and lowermost positions and permitting resisted movement away from the intermediate position; and
- means for providing lateral support to said wheel including a stabilizer member connected at a first end to said wheel support member at a location longitudinally displaced from said pivot axis and pivotably connected at a second end to the vehicle frame at a location longitudinally aligned with said pivot axis.

24. The wheel suspension system of claim 23 in which said stabilizer member is connected at said first end to said wheel support member at a location longitudinally aligned with said wheel rotation axis.

25. The wheel suspension system of claim 23 in which said stabilizer member is connected at said second end to the vehicle frame at a location transversely displaced from said attachment means relative to the longitudinal axis of the vehicle.

26. The wheel suspension system of claim 25 in which said stabilizer member is connected at said second end to the vehicle frame at a location adjacent the longitudinal axis of the vehicle.

27. The wheel suspension system of claim 23 in which said stabilizer member is rigidly fixed at said first end to said wheel support member.